(12) United States Patent
Hackner et al.

(10) Patent No.: US 9,223,044 B2
(45) Date of Patent: Dec. 29, 2015

(54) METHOD AND ARRANGEMENT FOR MAGNETICALLY DETERMINING A POSITION

(75) Inventors: Michael Hackner, Hemau OT Haag (DE); Volker Peters, Fürth (DE); Josef Sauerer, Herzogenaurach (DE)

(73) Assignee: FRAUNHOFER-GESELLSCHAFT ZUR FÖRDERUNG DER ANGEWANDTEN FORSCHUNG E.V., München (DE)

( * ) Notice: Subject to any disclaimer, the term of this patent is extended or adjusted under 35 U.S.C. 154(b) by 620 days.

(21) Appl. No.: 13/261,041

(22) PCT Filed: May 21, 2010

(86) PCT No.: PCT/EP2010/003140
§ 371 (c)(1),
(2), (4) Date: Dec. 15, 2011

(87) PCT Pub. No.: WO2010/136164
PCT Pub. Date: Dec. 2, 2010

(65) Prior Publication Data
US 2012/0084051 A1 Apr. 5, 2012

(30) Foreign Application Priority Data
May 25, 2009 (EP) .................................... 09006979

(51) Int. Cl.
*G01C 17/00* (2006.01)
*G01V 3/08* (2006.01)
*G01C 9/00* (2006.01)

(52) U.S. Cl.
CPC .................................... *G01V 3/081* (2013.01)

(58) Field of Classification Search
CPC ......... A61B 5/06; G01D 5/145; G01D 5/485; G01R 33/02; G01R 33/0206; G01R 33/04; G01R 33/07; G01V 3/081
USPC .............. 701/525; 702/153, 94; 600/409, 420; 324/207.22, 244, 301
See application file for complete search history.

(56) References Cited

U.S. PATENT DOCUMENTS 5,747,986 A * 5/1998 Hristoforou ............. 324/207.13
5,879,297 A    3/1999 Haynor et al.
(Continued)

OTHER PUBLICATIONS

J. Sherman et al., "Characterization of a Novel Magnetic Tracking System", Jun. 2007, IEEE Transactions on Magnetics, vol. 43, No. 6.*
S. Kumar et al., "Real-Time Tracking Magnetic Gradiometer for Underwater Mine Detection", 2004, MTTS/IEEE Techno-Oceans 04.*
S. Kumar et al., "Real-Time Tracking Gradiometer for use in an Autonomous Underwater Vehicle for Buried Minehunting", 2005, Oceans, Proceedings of MTS/IEEE.*

*Primary Examiner* — Phuong Huynh
(74) *Attorney, Agent, or Firm* — Breiner & Breiner, L.L.C.

(57) ABSTRACT

A method and an arrangement for magnetically determining a position using a permanent magnet are described, wherein the vector and local gradient of the magnetic flux density of the permanent magnet are measured using a position sensor, and the position and orientation of the magnetic dipole of the permanent magnet relative to the position sensor are calculated from the measured values. A spherical permanent magnet having homogenous magnetization is used in the method and the arrangement, preventing previously present cross-sensitivity between the position and orientation determination, and allowing measurement without prior calibration.

12 Claims, 1 Drawing Sheet

(56) References Cited

U.S. PATENT DOCUMENTS

| | | | |
|---|---|---|---|
| 6,479,768 B1* | 11/2002 | How | 178/19.03 |
| 7,886,766 B2* | 2/2011 | Radomsky et al. | 137/554 |
| 2002/0056202 A1* | 5/2002 | Tamura | 33/356 |
| 2007/0162404 A1* | 7/2007 | Gorelik et al. | 706/2 |
| 2007/0276218 A1* | 11/2007 | Yellen | 600/409 |
| 2007/0295089 A1* | 12/2007 | Velinsky et al. | 73/514.01 |
| 2010/0148762 A1* | 6/2010 | Imhof et al. | 324/207.13 |

OTHER PUBLICATIONS

T. Nara et al., "A Closed-Form Formula for Magnetic Dipole Localization by Measurement of its Magnetic Field and Spatial Gradients", Oct. 2006, IEEE Transactions on Magnetics, vol. 42, No. 10.*

M. Jeoffreys, "Discrimination and Identification of Unexploded Ordinances (UXO) Using Airborne Magnetic Gradients", 2006, Mathmetics in Industry Study Groups in South Africa.*

\* cited by examiner

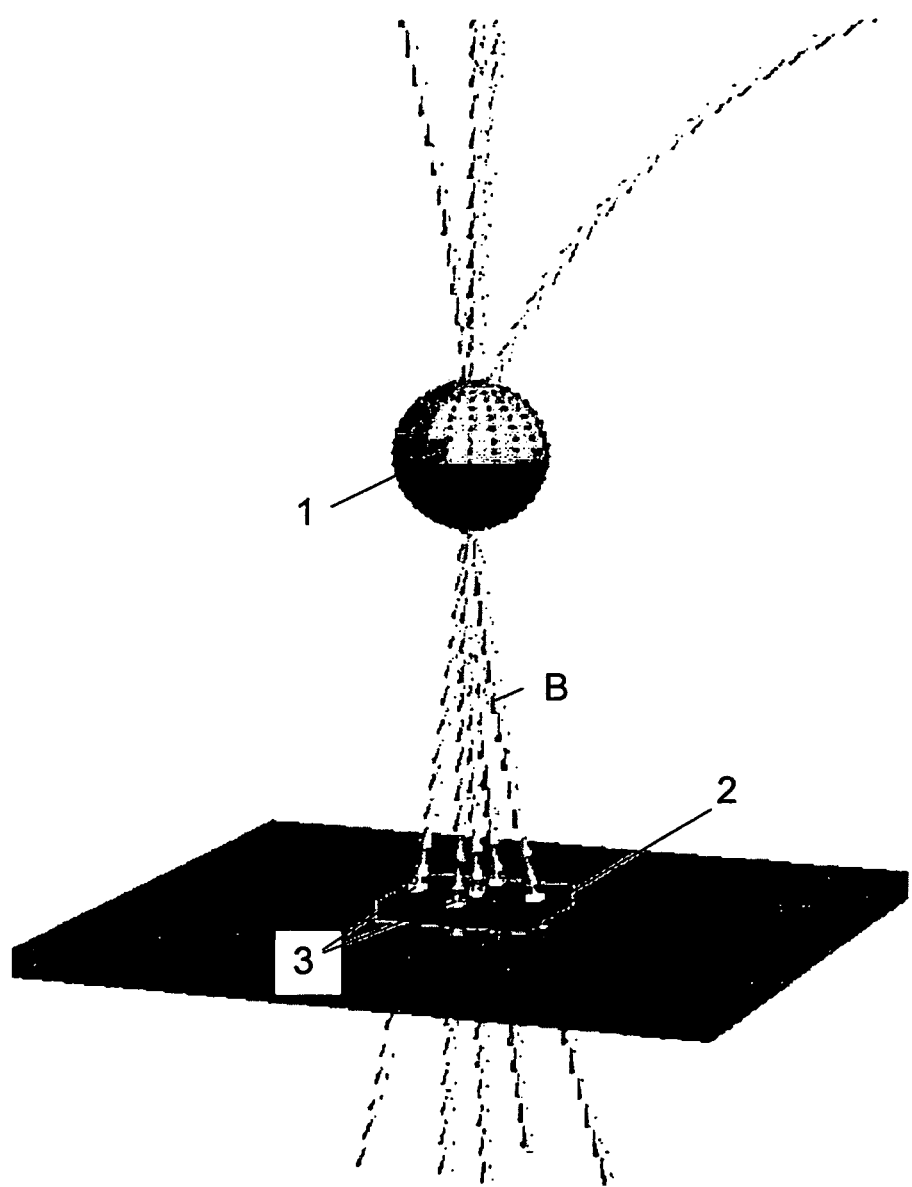

METHOD AND ARRANGEMENT FOR MAGNETICALLY DETERMINING A POSITION

TECHNICAL AREA

The present invention relates to a method and an arrangement for magnetically determining a position using a permanent magnet, in which the vector and the local gradient of the magnetic flux density $\vec{B}$ of the permanent magnet are measured at the location of a position sensor, and the position $\vec{r}$ and the orientation of the magnetic dipole of the permanent magnet relative to the position sensor are calculated from the vector and the local gradient of the magnetic flux density $\vec{B}$.

Such a determination of a position is used, for example, in applications in which the position of a body relative to another body or reference system, which move relative to one another, is to be detected. The permanent magnet and the position sensor are then respectively fastened on the two bodies, in order to be able to determine the current relative position and possible orientation of the bodies via the magnetic determination of the position.

PRIOR ART

Locating magnetic dipoles has represented a problem in geology, medicine, and defense technology for some time. Greatly varying methods are used here to determine the location and frequently also the orientation of objects which are magnetic or can be magnetized. Thus, primarily in medicine, but also in geology, methods are frequently used in which the magnetic field is scanned in a plane in either one direction or in multiple directions, whereby a type of two-dimensional magnetic image is obtained. The images are subsequently analyzed either by visual inspection or using suitable algorithms from image processing, in order to determine the location and the orientation of the magnetic objects.

Furthermore, utilizing geometric properties of the magnetic field in order to locate the magnetic dipoles from the magnetic measured data is known. For this purpose, the vector of the magnetic flux density is measured at four spatial positions, which are not located in one plane. Firstly, two planes are determined from the position and the magnetic field vector of each two positions which are located in different planes. The intersection straight line of these two planes is simultaneously the axis of the magnetic dipole. The position of the dipole on this straight line can then be determined from further geometric considerations, as explained in greater detail, for example, in G. Cauffet et al.: "Geometric Construction Technic to Localization of a Magnetic Dipole", COMPUMAG 2001, 13th Conference on the Computation of Electromagnetic Fields, Lyon-Evian.

In applications of defense technology, in particular for mine detection, and geology, dipoles are located by measuring the gradients using discretely constructed magnetic field sensors, which can measure the change of the magnetic field between two different locations, i.e., the local gradients, by spatial offset. The position of the dipoles may be determined from these measured values using the inverted gradient tensors of the dipoles. The determination of the gradients in one plane is sufficient for this purpose. Examples of this technology are found in S. Kumar et al., "Real-Time Tracking Magnetic Gradiometer for Underwater Mine Detection", OCEANS 04. MTTS/IEEE TECHNO-OCEAN 04, ISBN: 0-7803-8669-8/04, 2004; S. Kumar et al., "Real-Time Tracking Gradiometer for use in an Autonomous Underwater Vehicle for Buried Minehunting", OCEANS, 2005, Proceedings of MTS/IEEE, ISBN: 0-933957-34-3; Takaaki Nara et al., "A Closed-Form Formula for Magnetic Dipole Localization by Measurement of Its Magnetic Field and Spatial Gradients", IEEE TRANSACTIONS ON MAGNETICS, VOL. 42, NO. 10 October 2006, pp. 3291-3293; Frahm, C. P.: "Inversion of the magnetic field gradient equations for a magnetic dipole field", Naval Coastal Systems Laboratory, Informal Report (1972), NCSL, pp. 135-172, Panama City, Fla., or in M. C. Jeoffreys: "DISCRIMINATION AND IDENTIFICATION OF UNEXPLODED ORDINANCES (USO) USING AIRBORNE MAGNETIC GRADIENTS", Mathematics in Industry Study Groups in South Africa>MISGA 2006, University of the Witwatersrand (23rd-27 Jan. 2006).

In this case and in the present application, the term gradient does not mean the mathematical operator of the vector calculation, but rather the derivatives (or differential quotients) according to the directions in space (location derivatives). These derivatives are typically determined according to the three Cartesian coordinate directions. However, the use of other coordinate systems is also fundamentally possible.

A further approach to determine the position from the measured magnetic field and their gradients comprises not inverting the field equations, but rather determining the parameters of the field equation by means of regression, so that the errors between equations and measured data are minimal (least square fit). Such a procedure is described, for example, in S. L. Helwig et al., "Inversion von ortsaufgelösten Wirbelstrommessdaten zur Bestimmung der Lage and Geometrie von Landminen [Inversion of Location-Resolved Eddy Current Measured Data to Determine the Location and Geometry of Landmines]"; DGZfP report volume 94-CD, DGZfP Annual Meeting 2005, poster 26.

For an integration of the measurement of the magnetic field of a permanent magnet and the calculation of the position or orientation of the magnet in a compact position sensor, methods which are based on screening or approximations by fitting algorithms are excluded because of the required high computing power. If such a position sensor is to be integrated on a chip, methods which require the magnetic field sensor in various planes also do not come into consideration. Therefore, only the above technology of measuring the vector and the location gradient of the magnetic flux density suggests itself for such applications, since an arrangement of the magnetic field sensors in one plane is sufficient for this technology. For this purpose, ring-shaped, cylindrical, and cuboid permanent magnets are used as permanent magnets.

In this known technology, however, the linear position and orientation of the permanent magnet have not previously been determinable independently of one another. A deviation of the orientation from the predefined direction, for example, due to a skewed magnetization of the magnets or tolerances during the installation, always also influences the measurement of the linear position. In the reverse case, i.e., if the location of the rotational axis is not optimally aligned with the axis of the magnet and the location of the magnetic field sensors, this also results in a deviation of the measured orientation from the actual orientation. This cross-sensitivity is disadvantageous for the application of this technology to determining a position. Furthermore, the ascertained measured values initially have an arbitrary scale in this technology, which does result from the arrangement, but is not simple to ascertain. The measurement must therefore typically be calibrated. In addition, in the case of linear movements, linearization of the detected measured values is necessary to ascertain the linear position.

The problem of the present invention comprises specifying a method and an arrangement for magnetically determining a position, which allow an integration of the magnetic sensors and the analysis electronics in a compact position sensor and a determination of the linear position and the orientation independently of one another.

DESCRIPTION OF THE INVENTION

The problem is solved by the method and the arrangement as described and claimed herein. Advantageous embodiments of the method and the arrangement are the subject matter of the claims or may be inferred from the following description and the exemplary embodiment.

In the proposed method for determining a position using a permanent magnet, the vector and the local gradient of the magnetic flux density $\vec{B}$ of the permanent magnet are measured using magnetic field sensors at the location of a position sensor. The position and the orientation of the magnetic dipole of the permanent magnet relative to the position sensor are calculated from the vector and the local gradient of the magnetic flux density $\vec{B}$. This calculation is performed in a known way based on the known dipole equation. The proposed method is distinguished in relation to the previous methods in that a spherical permanent magnet having homogeneous magnetization is used.

Through the use of a spherical permanent magnet, which has the properties of an ideal magnetic dipole in the exterior space, determining the position becomes independent of determining the orientation of the magnetic dipole. Thus, for example, for determining the position, the equations from T. Nara et al.: "A Closed-Form Formula for Magnetic Dipole Localization by Measurement of Its Magnetic Field and Spatial Gradients", IEEE TRANSACTIONS ON MAGNETICS, VOL. 42, NO. 10, OCTOBER 2006, pp. 3291-3293 may be used. For a selection of the reference coordinate system on the position sensor, these equations must solely be multiplied by the factor −1. For determining the orientation, i.e., of the vector of the magnetic moment WI, the equations for the dipole field may be taken from the theory and solved for $m_x$, $m_y$, and $m_z$.

In the proposed method, the position of the spherical permanent magnet in its three translational degrees of freedom and the orientation of its magnetization in two rotational degrees of freedom can be determined from the measured values. The third rotational degree of freedom cannot be determined, since the magnetic field of the permanent magnet is rotationally-symmetrical around its magnetization axis.

The proposed arrangement for determining a position accordingly comprises the spherical and homogeneously magnetized permanent magnet and a position sensor arranged separately from the permanent magnet. The position sensor is implemented to measure the vector and the local gradient of the magnetic flux density $\vec{B}$ of the permanent magnet at the location of the position sensor and has analysis electronics or an analysis device, which calculate the position $\vec{r}$ and the orientation of the magnetic dipole of the permanent magnet relative to the position sensor, preferably in the reference system of the position sensor, from the vector and the spatial gradients of the magnetic flux density $\vec{B}$.

In the proposed method and the associated arrangement, the position sensor preferably comprises multiple 3-D magnetic field sensors, which are arranged in a plane. The position sensor therefore comprises a two-dimensional arrangement of magnetic field sensors, which are capable of measuring the magnetic field or the magnetic flux density vector in all three spatial directions of the Cartesian coordinate system and determining for the first time five of the six mechanical degrees of freedom of the permanent magnet therefrom. The magnetic field sensors are placed in the plane so that, in addition to the magnetic field or magnetic flux density vector, the gradients thereof in the two Cartesian directions in the plane of the sensors can also be measured.

The following two equations are preferably used for determining the measured variables:

$$\vec{r} = \begin{pmatrix} x_p \\ y_p \\ z_p \end{pmatrix} = 3 \frac{\begin{pmatrix} \partial_y B_Y^2 + \partial_X B_X \cdot \partial_Y B_Y + \partial_Y B_Z^2 & -(\partial_X B_X \cdot \partial_Y B_X + \partial_Y B_X \cdot \partial_Y B_Y + \partial_X B_Z \cdot \partial_Y B_Z) & \partial_X B_Z \cdot \partial_Y B_Y - \partial_Y B_X \cdot \partial_Y B_Z \\ -(\partial_X B_X \cdot \partial_Y B_X + \partial_Y B_Y + \partial_X B_Z \cdot \partial_Y B_Z) & \partial_X B_X^2 + \partial_X B_X \cdot \partial_Y B_Y + \partial_X B_Z^2 & \partial_X B_X \cdot \partial_Y B_Z - \partial_Y B_X \cdot \partial_X B_Z \\ \partial_X B_Z \cdot \partial_Y B_Y - \partial_Y B_X \cdot \partial_Y B_Z & \partial_X B_X \cdot \partial_Y B_Z - \partial_Y B_X \cdot \partial_X B_Z & \partial_Y B_X^2 - \partial_X B_X \cdot \partial_Y B_Y \end{pmatrix}}{\partial_X B_X^2 \cdot \partial_Y B_Y - \partial_X B_X \cdot \partial_Y B_X^2 + \partial_X B_X \cdot \partial_Y B_Y^2 + \partial_X B_X \cdot \partial_Y B_Z^2 - \partial_Y B_X^2 \cdot \partial_Y B_Y - 2 \cdot \partial_Y B_X \cdot \partial_X B_Z \cdot \partial_Y B_Z + \partial_X B_Z^2 \cdot \partial_Y B_Y} \begin{pmatrix} B_X \\ B_Y \\ B_Z \end{pmatrix}$$

$$\begin{pmatrix} m_x \\ m_y \\ m_z \end{pmatrix} = \frac{2 \cdot \pi}{\mu_0} \sqrt{x_p^2 + y_p^2 + z_p^2} \cdot \begin{pmatrix} x_p^2 - 2 \cdot y_p^2 - 2 \cdot z_p^2 & 3 \cdot x_p \cdot y_p & 3 \cdot x_p \cdot z_p \\ 3 \cdot x_p \cdot y_p & -2 \cdot x_p^2 + y_p^2 - 2 \cdot z_p^2 & 3 \cdot y_p \cdot z_p \\ 3 \cdot x_p \cdot z_p & 3 \cdot y_p \cdot z_p & -2 \cdot x_p^2 - 2 \cdot y_p^2 + z_p^2 \end{pmatrix} \cdot \begin{pmatrix} B_x \\ B_y \\ B_z \end{pmatrix}$$

While in the previously known methods of linear position sensor systems having permanent-magnetic encoders, the direction of the magnetization very strongly influences the measured value of the linear position, this cross-sensitivity no longer occurs in the proposed method and the associated arrangement. Even if the magnet rotates in the arrangement, for example, because of mechanical tolerances or as technically required, the measurement delivers a precise value for the translational position of the encoder magnets, which is independent of these rotations. Furthermore, the proposed method and the associated arrangement offer the advantage of absolute scaling of the results only based on the arrangement of the magnetic field sensors. If the mutual positions of the magnetic field sensors are sufficiently well known, for example, because they are defined in semiconductor technology by means of lithography on a chip, neither calibration or linearization of the measurement results are required. In the proposed arrangement, the magnetic field sensors may be integrated together with the analysis electronics in an ASIC (application-specific integrated circuit), since all magnetic field sensors can be arranged in the chip plane of the ASIC.

Five 3-D magnetic field sensors, for example, Hall sensors, in a cross-shaped arrangement are preferably used to measure the vector and the local gradient of the magnetic flux density. Four of the magnetic field sensors are located at the corners of an imaginary rectangle in this case, while the further magnetic field sensor is arranged in the center of the rectangle. Of course, other geometrical arrangements of 3-D magnetic field sensors in a plane may also be used to detect the vector of the magnetic flux density $\vec{B}$ in three dimensions and the local gradients in the plane of the sensors in two Cartesian spatial directions. This can also be performed using four or also only three 3-D magnetic field sensors, for example, from whose measured values, in combination with a coordinate transformation or corresponding weighting of the measured values, the desired variables can also be ascertained. In the case of four magnetic field sensors, for example, a rectangular or rhomboid arrangement can be selected, in the case of three magnetic field sensors, for example, an arrangement of a right triangle or equilateral triangle. In these arrangements having three or four magnetic field sensors, the components $B_x$, $B_y$, and $B_z$ of the vector of the magnetic flux density $\vec{B}$ can either be measured using one of the 3-D magnetic field sensors or calculated from the measured values of multiple or all of the 3-D magnetic field sensors. It is no longer possible to determine these measured variables using fewer than three 3-D magnetic field sensors.

BRIEF DESCRIPTION OF THE DRAWINGS

The proposed method and the associated arrangement will be explained briefly once again hereafter on the basis of an exemplary embodiment in conjunction with the figure. In the figure:

FIG. 1 shows a schematic view of the embodiment of the permanent magnet and the position sensor in the proposed method.

WAYS OF IMPLEMENTING THE INVENTION

In the present exemplary embodiment, the spherical permanent magnet 1 is attached over the position sensor 2, an ASIC. The position sensor 2 comprises five 3-D magnetic field sensors 3, which are arranged in a cross shape, in a defined raster. The magnetic flux density $\vec{B}$ of the permanent magnet 1 is measured in all three spatial components using the middle 3-D magnetic field sensor. The gradients of these components are determined using the four outer 3-D magnetic field sensors. For this purpose—in relation to FIG. 1—measured value ($B_x$, $B_y$, $B_z$) of the right magnetic field sensor minus the measured value ($B_x$, $B_y$, $B_z$) of the left magnetic field sensor is used for determining the derivative according to x and measured value ($B_x$, $B_y$, $B_z$) of the upper magnetic field sensor minus the measured value ($B_x$, $B_y$, $B_z$) of the lower magnetic field sensor is used for determining the derivative according to y. Through the cross-shaped arrangement symmetrically to the middle 3-D magnetic field sensor, a value therefore results, which can be assigned as representative of the position of the middle magnetic field sensor. Therefore, all measured values are approximately known for the position of the middle 3-D magnetic field sensor. By using these measured values in the above-described equations, the position and orientation of the magnetic dipole of the permanent magnet 1 in the reference system of the position sensor 2 can be determined. The analysis is performed in this case directly by the integrated analysis circuit in the position sensor 2, so that it outputs the numeric values for the position and orientation. Fastening of the permanent magnet 1 and the position sensor 2 on different bodies, which are movable relative to one another, therefore allows the relative position and orientation of the two bodies to one another to be determined at any time.

LIST OF REFERENCE NUMERALS

1 permanent magnet
2 position sensor
3 3-D magnetic field sensor

The invention claimed is:

1. A method for determining a position using a permanent magnet comprising:
   providing a spherical permanent magnet having homogeneous magnetization;
   providing a position sensor separate from said spherical permanent magnet;
   measuring with said position sensor a vector and a local gradient of a magnetic flux density $\vec{B}$ of the spherical permanent magnet at a location of the position sensor, and
   providing analysis electronics and calculating by said analysis electronics a position F and orientation of a magnetic dipole of the spherical permanent magnet relative to the position sensor from the vector and the local gradient of the magnetic flux density $\vec{B}$,
   wherein said measuring of the vector and the local gradient of the magnetic flux density $\vec{B}$ is by multiple 3-D magnetic field sensors, which are arranged in the position sensor in a plane so that the multiple 3-D magnetic field sensors can measure local gradients in two Cartesian spatial directions in the plane.

2. The method according to claim 1, wherein the 3-D magnetic field sensors are Hall sensors.

3. The method according to claim 1 wherein five of said 3-D magnetic field sensors, four of which are arranged at four corners of an imaginary rectangle and one of which is arranged centrally in the rectangle, are used for the measuring of the vector and the local gradient of the magnetic flux density $\vec{B}$.

4. The method according to claim 1, wherein the position $\vec{r}$ of the magnetic dipole is determined by said analysis electronics through an equation as follows:

$$\vec{r} = \begin{pmatrix} x_p \\ y_p \\ z_p \end{pmatrix} = 3 \frac{\begin{pmatrix} \partial_y B_Y^2 + \partial_X B_X \cdot \partial_Y B_Y + \partial_Y B_Z^2 & -(\partial_X B_X \cdot \partial_Y B_X + \partial_Y B_X \cdot \partial_Y B_Y + \partial_X B_Z \cdot \partial_Y B_Z) & \partial_X B_Z \cdot \partial_Y B_Y - \partial_Y B_X \cdot \partial_Y B_Z \\ -(\partial_X B_X \cdot \partial_Y B_X + \partial_Y B_X \cdot \partial_Y B_Y + \partial_X B_Z \cdot \partial_Y B_Z) & \partial_X B_X^2 + \partial_X B_X \cdot \partial_Y B_Y + \partial_X B_Z^2 & \partial_X B_X \cdot \partial_Y B_Z - \partial_Y B_X \cdot \partial_X B_Z \\ \partial_X B_Z \cdot \partial_Y B_Y - \partial_Y B_X \cdot \partial_Y B_Z & \partial_X B_X \cdot \partial_Y B_Z - \partial_Y B_X \cdot \partial_X B_Z & \partial_Y B_X^2 - \partial_X B_X \cdot \partial_Y B_Y \end{pmatrix}}{(\partial_X B_X^2 \cdot \partial_Y B_Y - \partial_X B_X \cdot \partial_Y B_X^2 + \partial_X B_X \cdot \partial_Y B_Y^2 + \partial_X B_X \cdot \partial_Y B_Z^2 - \partial_Y B_X^2 \cdot \partial_Y B_Y - 2 \cdot \partial_Y B_X \cdot \partial_X B_Z \cdot \partial_Y B_Z + \partial_X B_Z^2 \cdot \partial_Y B_Y)} \begin{pmatrix} B_X \\ B_Y \\ B_Z \end{pmatrix}.$$

5. The method according to claim 1, wherein the orientation of the magnetic dipole is determined by said analysis electronics through an equation as follows:

$$\begin{pmatrix} m_x \\ m_y \\ m_z \end{pmatrix} = \frac{2 \cdot \pi}{\mu_0} \sqrt{x_p^2 + y_p^2 + z_p^2} \cdot \begin{pmatrix} x_p^2 - 2 \cdot y_p^2 - 2 \cdot z_p^2 & 3 \cdot x_p \cdot y_p & 3 \cdot x_p \cdot z_p \\ 3 \cdot x_p \cdot y_p & -2 \cdot x_p^2 + y_p^2 - 2 \cdot z_p^2 & 3 \cdot y_p \cdot z_p \\ 3 \cdot x_p \cdot z_p & 3 \cdot y_p \cdot z_p & -2 \cdot x_p^2 - 2 \cdot y_p^2 + z_p^2 \end{pmatrix} \cdot \begin{pmatrix} B_x \\ B_y \\ B_z \end{pmatrix}.$$

6. The method according to claim 1, wherein the spherical permanent magnet and the position sensor are each fastened on bodies, whose relative position and orientation are to be determined.

7. An arrangement for determining a position using a permanent magnet and a position sensor comprising:

the permanent magnet arranged separately from the position sensor;

the position sensor implemented to measure a vector and a local gradient of a magnetic flux density $\vec{B}$ of the permanent magnet at a location of the position sensor; and analysis electronics which are adapted to calculate a position $\vec{r}$ and orientation of a magnetic dipole of the permanent magnet relative to the position sensor from the vector and a spatial gradient of the magnetic flux density $\vec{B}$;

wherein the permanent magnet is spherical and has a homogeneous magnetization, and wherein the position sensor has multiple 3-D magnetic field sensors, which are arranged in a plane so that the multiple 3-D magnetic field sensors measure local gradients in two Cartesian spatial directions in the plane, to measure the vector and the local gradient of the magnetic flux density $\vec{B}$.

8. The arrangement according to claim 7, wherein the 3-D magnetic field sensors are Hall sensors.

9. The arrangement according to claim 7, wherein the position sensor for measuring the vector and the local gradient of the magnetic flux density $\vec{B}$ has five 3-D magnetic field sensors, four of which are arranged at four corners of an imaginary rectangle and one of which is centrally arranged in the rectangle.

10. The arrangement according to claim 7, wherein the analysis electronics are adapted to determine the position $\vec{r}$ of the magnetic dipole through an equation as follows:

$$\vec{r} = \begin{pmatrix} x_p \\ y_p \\ z_p \end{pmatrix} = 3 \frac{\begin{pmatrix} \partial_y B_Y^2 + \partial_X B_X \cdot \partial_Y B_Y + \partial_Y B_Z^2 & -(\partial_X B_X \cdot \partial_Y B_X + \partial_Y B_X \cdot \partial_Y B_Y + \partial_X B_Z \cdot \partial_Y B_Z) & \partial_X B_Z \cdot \partial_Y B_Y - \partial_Y B_X \cdot \partial_Y B_Z \\ -(\partial_X B_X \cdot \partial_Y B_X + \partial_Y B_X \cdot \partial_Y B_Y + \partial_X B_Z \cdot \partial_Y B_Z) & \partial_X B_X^2 + \partial_X B_X \cdot \partial_Y B_Y + \partial_X B_Z^2 & \partial_X B_X \cdot \partial_Y B_Z - \partial_Y B_X \cdot \partial_X B_Z \\ \partial_X B_Z \cdot \partial_Y B_Y - \partial_Y B_X \cdot \partial_Y B_Z & \partial_X B_X \cdot \partial_Y B_Z - \partial_Y B_X \cdot \partial_X B_Z & \partial_Y B_X^2 - \partial_X B_X \cdot \partial_Y B_Y \end{pmatrix}}{(\partial_X B_X^2 \cdot \partial_Y B_Y - \partial_X B_X \cdot \partial_Y B_X^2 + \partial_X B_X \cdot \partial_Y B_Y^2 + \partial_X B_X \cdot \partial_Y B_Z^2 - \partial_Y B_X^2 \cdot \partial_Y B_Y - 2 \cdot \partial_Y B_X \cdot \partial_X B_Z \cdot \partial_Y B_Z + \partial_X B_Z^2 \cdot \partial_Y B_Y)} \begin{pmatrix} B_X \\ B_Y \\ B_Z \end{pmatrix}.$$

11. The arrangement according to claim 7, wherein the analysis electronics are adapted to determine the orientation of the magnetic dipole through an equation as follows:

$$\begin{pmatrix} m_x \\ m_y \\ m_z \end{pmatrix} = \frac{2 \cdot \pi}{\mu_0} \sqrt{x_p^2 + y_p^2 + z_p^2} \cdot \begin{pmatrix} x_p^2 - 2 \cdot y_p^2 - 2 \cdot z_p^2 & 3 \cdot x_p \cdot y_p & 3 \cdot x_p \cdot z_p \\ 3 \cdot x_p \cdot y_p & -2 \cdot x_p^2 + y_p^2 - 2 \cdot z_p^2 & 3 \cdot y_p \cdot z_p \\ 3 \cdot x_p \cdot z_p & 3 \cdot y_p \cdot z_p & -2 \cdot x_p^2 - 2 \cdot y_p^2 + z_p^2 \end{pmatrix} \cdot \begin{pmatrix} B_x \\ B_y \\ B_z \end{pmatrix}.$$

12. The arrangement according to claim 7, wherein the position sensor is an application-specific integrated circuit (ASIC).

\* \* \* \* \*

UNITED STATES PATENT AND TRADEMARK OFFICE
CERTIFICATE OF CORRECTION

PATENT NO. : 9,223,044 B2
APPLICATION NO. : 13/261041
DATED : December 29, 2015
INVENTOR(S) : Michael Hackner, Volker Peters and Josef Sauerer Page 1 of 2

It is certified that error appears in the above-identified patent and that said Letters Patent is hereby corrected as shown below:

IN THE SPECIFICATION

Column 2, line 30, "and" should read -- und --.

Column 3, line 20, "The position and the orientation" should read -- The position $\vec{r}$ and the orientation --.

Column 3, line 65, "WI" should read -- $\vec{m}$ --.

Columns 3-4, lines 36-59, the equations set forth are in error due to the spacing and placement of the superscripts and should read as follows $$\vec{r} = \begin{pmatrix} x_p \\ y_p \\ z_p \end{pmatrix} = 3 \frac{\begin{pmatrix} \partial_y B_y{}^2 + \partial_x B_x \cdot \partial_y B_y + \partial_y B_z{}^2 & -(\partial_x B_x \cdot \partial_y B_x + \partial_y B_x \cdot \partial_y B_y + \partial_x B_z \cdot \partial_y B_z) & \partial_x B_z \cdot \partial_y B_y - \partial_y B_x \cdot \partial_y B_z \\ -(\partial_x B_x \cdot \partial_y B_x + \partial_y B_x \cdot \partial_y B_y + \partial_x B_z \cdot \partial_y B_z) & \partial_x B_x{}^2 + \partial_x B_x \cdot \partial_y B_y + \partial_x B_z{}^2 & \partial_x B_x \cdot \partial_y B_z - \partial_y B_x \cdot \partial_x B_z \\ \partial_x B_z \cdot \partial_y B_y - \partial_y B_x \cdot \partial_y B_z & \partial_x B_x \cdot \partial_y B_z - \partial_y B_x \cdot \partial_x B_z & \partial_y B_x{}^2 - \partial_x B_x \cdot \partial_y B_y \end{pmatrix}}{\partial_x B_x{}^2 \cdot \partial_y B_y - \partial_x B_x \cdot \partial_y B_x{}^2 + \partial_x B_x \cdot \partial_y B_y{}^2 + \partial_x B_x \cdot \partial_y B_z{}^2 - \partial_y B_x{}^2 \cdot \partial_y B_y - 2 \cdot \partial_y B_x \cdot \partial_x B_z \cdot \partial_y B_z + \partial_x B_z{}^2 \cdot \partial_y B_y} \begin{pmatrix} B_x \\ B_y \\ B_z \end{pmatrix}$$

$$\begin{pmatrix} m_x \\ m_y \\ m_z \end{pmatrix} = \frac{2 \cdot \pi}{\mu_0} \cdot \sqrt{x_p{}^2 + y_p{}^2 + z_p{}^2} \cdot \begin{pmatrix} x_p{}^2 - 2 \cdot y_p{}^2 - 2 \cdot z_p{}^2 & 3 \cdot x_p \cdot y_p & 3 \cdot x_p \cdot z_p \\ 3 \cdot x_p \cdot y_p & -2 \cdot x_p{}^2 + y_p{}^2 - 2 \cdot z_p{}^2 & 3 \cdot y_p \cdot z_p \\ 3 \cdot x_p \cdot z_p & 3 \cdot y_p \cdot z_p & -2 \cdot x_p{}^2 - 2 \cdot y_p{}^2 + z_p{}^2 \end{pmatrix} \cdot \begin{pmatrix} B_x \\ B_y \\ B_z \end{pmatrix}$$

--.

Column 5, line 67, "($B_y$, $B_y$, $B_z$)" should read -- ($B_x$, $B_y$, $B_z$) --.

IN THE CLAIMS

Claim 1, line 45, "position F" should read -- position $\vec{r}$ --.

Signed and Sealed this
Seventeenth Day of May, 2016

Michelle K. Lee
*Director of the United States Patent and Trademark Office*

CERTIFICATE OF CORRECTION (continued)
U.S. Pat. No. 9,223,044 B2

Claims 4 and 10, the equation set forth is in error due to the spacing and placement of the superscripts and should read as follows $$\vec{r} = \begin{pmatrix} x_p \\ y_p \\ z_p \end{pmatrix} = 3 \frac{\begin{pmatrix} \partial_y B_y{}^2 + \partial_x B_x \cdot \partial_y B_y + \partial_y B_z{}^2 & -(\partial_x B_x \cdot \partial_y B_x + \partial_y B_x \cdot \partial_y B_y + \partial_x B_z \cdot \partial_y B_z) & \partial_x B_z \cdot \partial_y B_y - \partial_y B_x \cdot \partial_y B_z \\ -(\partial_x B_x \cdot \partial_y B_x + \partial_y B_x \cdot \partial_y B_y + \partial_x B_z \cdot \partial_y B_z) & \partial_x B_x{}^2 + \partial_x B_x \cdot \partial_y B_y + \partial_x B_z{}^2 & \partial_x B_x \cdot \partial_y B_z - \partial_y B_x \cdot \partial_x B_z \\ \partial_x B_z \cdot \partial_y B_y - \partial_y B_x \cdot \partial_y B_z & \partial_x B_x \cdot \partial_y B_z - \partial_y B_x \cdot \partial_x B_z & \partial_y B_x{}^2 - \partial_x B_x \cdot \partial_y B_y \end{pmatrix}}{\partial_x B_x{}^2 \cdot \partial_y B_y - \partial_x B_x \cdot \partial_y B_x{}^2 + \partial_x B_x \cdot \partial_y B_y{}^2 + \partial_x B_x \cdot \partial_y B_z{}^2 - \partial_y B_x{}^2 \cdot \partial_y B_y - 2 \cdot \partial_y B_x \cdot \partial_x B_z \cdot \partial_y B_z + \partial_x B_z{}^2 \cdot \partial_y B_y} \begin{pmatrix} B_x \\ B_y \\ B_z \end{pmatrix}$$

Claims 5 and 11, the equation set forth is in error due to the spacing and placement of the superscripts and should read as follows $$\begin{pmatrix} m_x \\ m_y \\ m_z \end{pmatrix} = \frac{2 \cdot \pi}{\mu_0} \cdot \sqrt{x_p{}^2 + y_p{}^2 + z_p{}^2} \cdot \begin{pmatrix} x_p{}^2 - 2 \cdot y_p{}^2 - 2 \cdot z_p{}^2 & 3 \cdot x_p \cdot y_p & 3 \cdot x_p \cdot z_p \\ 3 \cdot x_p \cdot y_p & -2 \cdot x_p{}^2 + y_p{}^2 - 2 \cdot z_p{}^2 & 3 \cdot y_p \cdot z_p \\ 3 \cdot x_p \cdot z_p & 3 \cdot y_p \cdot z_p & -2 \cdot x_p{}^2 - 2 \cdot y_p{}^2 + z_p{}^2 \end{pmatrix} \cdot \begin{pmatrix} B_x \\ B_y \\ B_z \end{pmatrix}$$